United States Patent [19]

Durbin

[11] Patent Number: 5,101,711
[45] Date of Patent: Apr. 7, 1992

[54] AIR FLOW DIVERTER

[76] Inventor: James W. Durbin, R.R. Box 156, Wapella, Ill. 61777

[21] Appl. No.: 639,590

[22] Filed: Jan. 9, 1991

[51] Int. Cl.⁵ .............................................. B60J 1/20
[52] U.S. Cl. .................... 454/128; 454/131; 454/142
[58] Field of Search ................... 98/2.13, 2.12, 18, 92, 98/93

[56] References Cited

U.S. PATENT DOCUMENTS

| | | | |
|---|---|---|---|
| 2,557,908 | 6/1951 | Cross | 98/2.12 |
| 2,586,090 | 2/1952 | Riggs | 98/2.13 |
| 3,000,663 | 4/1959 | Lucchesi | 296/1 |
| 4,085,665 | 4/1978 | Paxton | 98/2.13 |
| 4,393,753 | 7/1983 | Chatlos | 98/2.12 |

Primary Examiner—Albert J. Makay
Assistant Examiner—William C. Doerrler

[57] ABSTRACT

An enclosed channel, open at each end, in a form to redirect air flow 180°. Positioned from top of opening in rear operable window to above vehicle into air flow. Secured in position by projections fitting into upper and lower window channels. Projections held in channels by expanding spring tension on sliding fit supports.

1 Claim, 2 Drawing Sheets

AIR FLOW DIVERTER

BACKGROUND

1. Field of Invention

This invention relates to vehicle ventilation, specifically to divert air flowing over vehicle, primarily small trucks, into rear window of vehicles equipped with rear operable windows.

2. Discussion of Art

Heretofore, fresh air was provided by factory installed vents, in or below dash, supplied by ducts from front of vehicle or by opening side windows. Opening rear window only provided easy exit for air. Due to length, size, and routing of ducts, air flow from vents is often insufficient and must be supplemented by using an electric fan. Also incoming air often comes from near road surface. Lowering side windows increases air flow but creates much noise while air flows behind passengers.

Some deflectors have been designed to attach to the top rear of vehicles, primarily station wagons, which were to deflect air across rear window and down behind vehicle and to act as spoilers.

U.S. Pat. No. 3,000,663 to Gino J. Lucchesi, June 23, 1959, Ser. No. 822,316.

U.S. Pat. No. 4,174,863 to Hane Dotz Boblingen, Oct. 27, 1977, Ser. No. 846,256.

U.S. Pat. No. 4,674,788 to Yutaka Ohmura, Ryouji Shimura, Feb. 27, 1985.

Whereas my invention moves air from above vehicle, at a velocity related to vehicle speed, against inside of windshield to be diffused more evenly around interior of vehicle with little noise.

Therefore in the competitive auto aftermarket industry the rear operative windows have been used primarily for air flow exit. Whereas my invention not only uses this opening for air flow exit but also as a source for incoming fresh air.

OBJECTS AND ADVANTAGES

Therefore several objects and advantages of my invention are:

(a) installation and removal is quick and easy with no damage or change to surrounding structure;

(b) there are few moving parts, therefore, a long useful life should be expected;

(c) diverter brings in air from above vehicle with less dirt and pollution than near road surface;

(d) directs air flow against inside of windshield which redirects it more evenly around interior;

(e) factory vents can still be used;

(f) side windows can be left up for less noise or lowered if desired;

(g) screens and filters can be added for removal of dirt, insects, and other foreign materials;

(h) adjustable openings to control air flow volume can be added;

(i) small openings in rear surface would permit water to exit to rear;

(j) size of unit is restricted only by size of window opening;

(k) various colors and shapes can compliment vehicle or be a novelty;

(l) can be manufactured from many suitable materials; and (m) further objects and advantages will be apparent from consideration of my drawings and descriptions.

Figure 1:
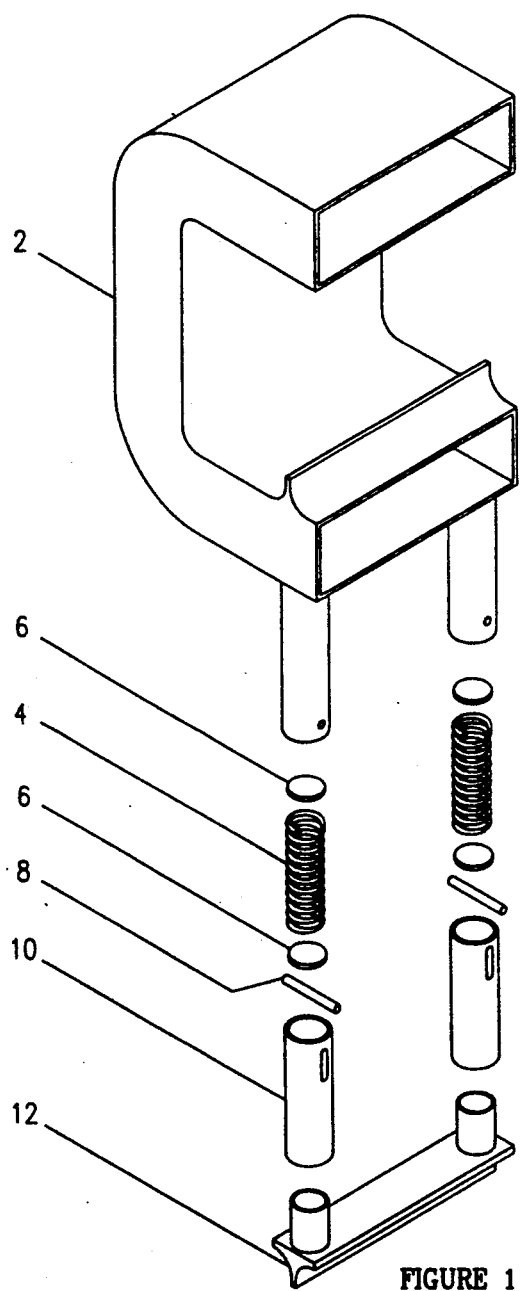
FIG. 1 shows a layout of parts from a right front perspective.
Figure 2:
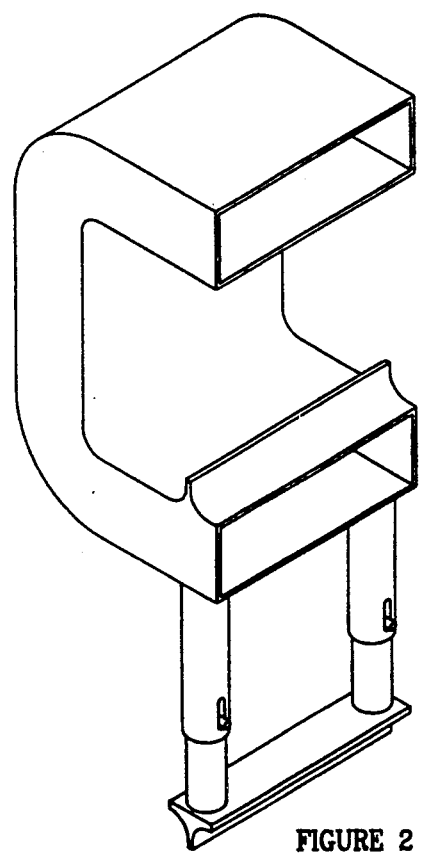
FIG. 2 is a view of a complete assembled diverter from the right front.
Figure 3:
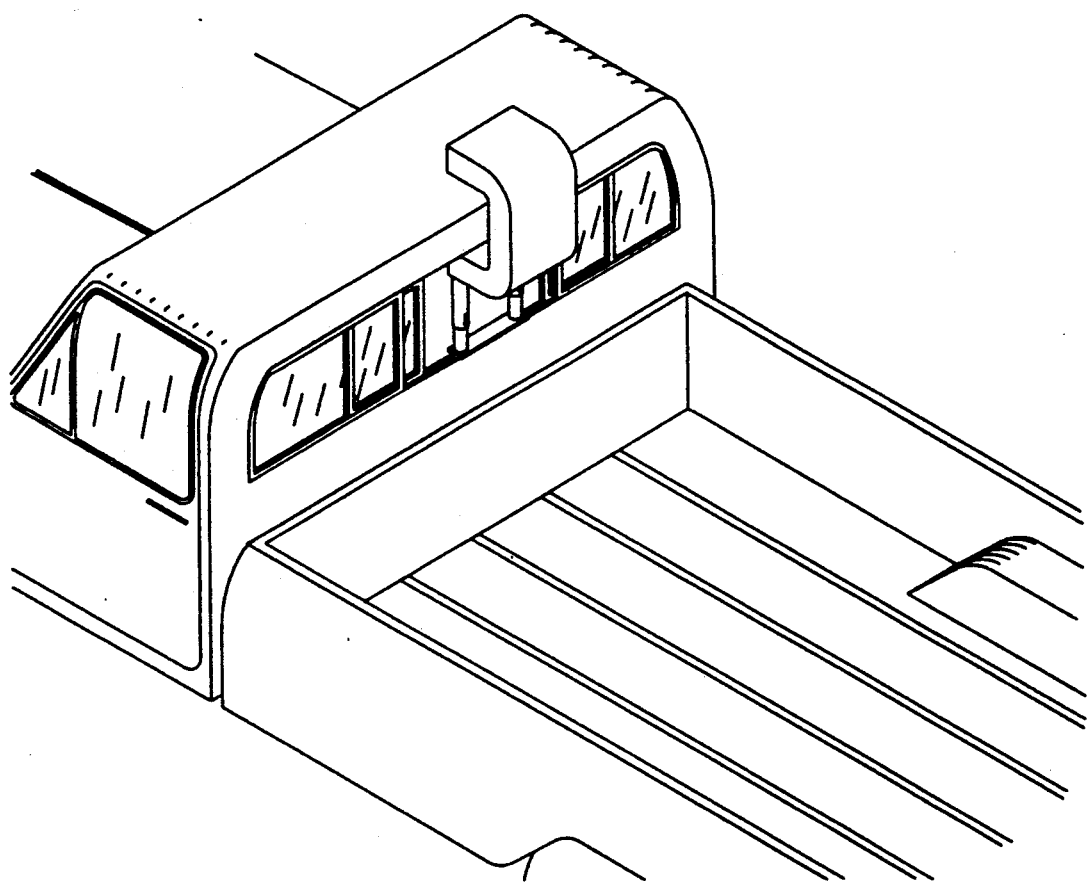
FIG. 3 is a diverter mounted on vehicle shown from the left rear.

List of Reference Numerals 2 body
4 spring
6 pad
8 stop
10 lower support
12 lower retainer

DESCRIPTION OF INVENTION

In FIG. 1, item 2 is the body of the air flow diverter. The top front of the body is a rectangular opening; this entrance leads into a channel that turns downward approximately 90° for a distance determined by the size of vehicle. The channel then turns forward at about a 90° angle to complete a 180° turn, to exit into vehicle. Above the exit is a projection parallel to window opening of proper size and strength to fit into the top window channel and hold unit in place against wind force. The lower portion of the body consists of two tube shaped structures. At the lower end of these structures is a hole from front to rear. These structures must be large enough to contain other parts as listed later.

Item 12 is the lower retainer. The bottom portion of the retainer is a projection, similar to that on body item 2, designed to fit into lower window channel. On the top side of the retainer are two projections to fit tightly into the lower supports item 10. These supports, item 10, fit into the lower structure of body with free movement, slots near one end aligned with holes in lower area of body. The length of supports are determined by window height.

Item 8 are stops. The stops hold unit together when not in window by going through holes in bottom of body and slots in top of lower supports. Slots must allow enough vertical movement to permit retainer to be installed and removed from window channel.

Item 4 are springs which fit into lower portion of body to exert vertical force against lower supports to hold projections firmly into top and bottom window channels. Springs must also be able to compress enough for installation and removal from window channels.

Item 6 are pads to be installed at each end of springs to help reduce wear and distribute pressure over larger surface. The overall size of the unit is limited only by the size of the rear window opening. By limiting the vertical height of the outlet of the body the inside rear view mirror sight path is only slightly restricted. Many materials are suitable for manufacture of this product. The main concern is to be able to withstand the high wind force.

OPERATION OF INVENTION

To install the air flow diverter from inside vehicle is a very simple procedure. With the rear window open the top of the diverter, item 2, goes out and up until the upper retainer can be started into the top channel of the window. Then by lifting lower supports, item 10, which compresses springs, the bottom retainer can be aligned and inserted into the lower window channel. To remove simply reverse the procedure.

As the vehicle moves forward air entering the top of diverter exits into the vehicle, against windshield, and is defused around interior of vehicle and flows out through rear window under diverter.

CONCLUSION, RAMIFICATION AND SCOPE OF INVENTION

Thus the reader can see this is a unique and effective method of bringing fresh air into a vehicle. The construction previously described is one of many ways of achieving this air flow. It can be as simple as a curved surface held in place by various means of support to more complex construction including lights, filters, and means of controlling air for volume and direction.

Therefore the scope of my invention should not be determined by the illustrated example, but by the applied claims legal equivalent.

I claim:

1. I claim a method of mounting and securing a device for redirecting air flow into the rear window of vehicles, having a read sliding window, comprising
   a. Projections of proper size to fit into top and bottom channels said sliding window
   b. One or more supports sliding into a cavity of the deflector body
   c. One or more springs in said cavities to provide tension between said body and said supports thereby holding said projections into said window channels.

* * * * *